United States Patent
Wing et al.

(10) Patent No.: US 12,012,511 B2
(45) Date of Patent: Jun. 18, 2024

(54) AGGREGATE-BASED MANDRELS AND COMPOSITIONS FOR PRODUCING SAME

(71) Applicant: Advanced Ceramics Manufacturing, LLC, Tucson, AZ (US)

(72) Inventors: Zachary Wing, Tucson, AZ (US); Mark Angier, Tucson, AZ (US)

(73) Assignee: ADVANCED CERAMICS MANUFACTURING, LLC, Tucson, AZ (US)

(*) Notice: Subject to any disclaimer, the term of this patent is extended or adjusted under 35 U.S.C. 154(b) by 0 days.

(21) Appl. No.: 16/762,343

(22) PCT Filed: Nov. 9, 2018

(86) PCT No.: PCT/US2018/059590
§ 371 (c)(1),
(2) Date: May 7, 2020

(87) PCT Pub. No.: WO2019/094443
PCT Pub. Date: May 16, 2019

(65) Prior Publication Data
US 2021/0355311 A1   Nov. 18, 2021

Related U.S. Application Data

(60) Provisional application No. 62/582,456, filed on Nov. 7, 2017.

(51) Int. Cl.
| | | |
|---|---|---|
| C08L 39/06 | (2006.01) | |
| B29C 33/38 | (2006.01) | |
| B29C 70/48 | (2006.01) | |
| C08L 79/00 | (2006.01) | |
| C08L 89/00 | (2006.01) | |
| B29K 105/16 | (2006.01) | |
| B29L 31/00 | (2006.01) | |

(52) U.S. Cl.
CPC .......... *C08L 39/06* (2013.01); *B29C 33/3842* (2013.01); *B29C 70/48* (2013.01); *C08L 79/00* (2013.01); *C08L 89/00* (2013.01); *B29K 2039/06* (2013.01); *B29K 2105/16* (2013.01); *B29L 2031/757* (2013.01); *C08L 2203/30* (2013.01); *C08L 2205/06* (2013.01)

(58) Field of Classification Search
CPC .......... C08L 39/06; C08L 89/00; C08L 79/00; C08L 2203/30; C08L 2205/06; B29C 70/48; B29C 33/3842; B29K 2105/16; B29K 2039/06
See application file for complete search history.

(56) References Cited

U.S. PATENT DOCUMENTS

| | | |
|---|---|---|
| 2005/0116136 A1 | 6/2005 | Artz et al. |
| 2006/0197244 A1 | 9/2006 | Simpson et al. |
| 2010/0237531 A1 | 9/2010 | Lyons et al. |
| 2015/0204000 A1 | 7/2015 | Bergström |
| 2016/0229090 A1* | 8/2016 | Wallen .................. B28B 13/021 |

OTHER PUBLICATIONS

Search Report and Written Opinion from Application No. PCT/US2018/059950 dated Jan. 22, 2019 (10 pages).

* cited by examiner

*Primary Examiner* — Robert D Harlan
(74) *Attorney, Agent, or Firm* — Troutman Pepper Hamilton Sanders LLP; Dustin B. Weeks (57) ABSTRACT

Compositions for use in manufacturing a water-soluble tooling material are disclosed. The compositions include an organic binder material that is water-soluble, a melt processing aid capable of reducing the glass transition temperature of the organic binder, and an aggregate material. A method for forming a composite structure is similarly disclosed and involves production of a mandrel by depositing a particulate mixture, including the aggregate material, the binder, and the melt processing aid, into a mold and removing the mandrel from the mold. Once finished, the mandrel can be used in manufacturing polymer and/or composite components.

19 Claims, 3 Drawing Sheets

AGGREGATE-BASED MANDRELS AND COMPOSITIONS FOR PRODUCING SAME

RELATED APPLICATIONS

This application also claims, under 35 U.S.C. § 119(e), the benefit of U.S. Provisional Patent Application Ser. No. 62/582,456, filed Nov. 7, 2017. The entire contents, references and substance of all the above are hereby incorporated by reference as if fully set forth below.

TECHNICAL FIELD

The present invention relates to composites, devices, and methods for producing composite parts. In particular, this invention relates to mandrels for the mass production of polymer or composite structures, and to composites, devices, and methods for forming such mandrels.

BACKGROUND

Composite materials, such as fiber-reinforced composites, can be used to produce corrosion resistant and lightweight structures. "Composite material," as used herein, refers to a material comprised of two or more separate materials, which may include a fiber or polymer binder or a combination of the two. The most common composites are normally comprised of a fiber (Glass, Kevlar, Carbon, etc.) impregnated with a polymer (Epoxy, Polyester, Urethane, etc.). In comparison to lightweight metals such as aluminum, structures formed of composite materials have high strength-to-weight and high stiffness-to-weight ratios. As a result, composite materials have been used to fabricate a wide variety of structures including, most notably, aircraft structures.

In the aircraft industry, composite components were initially limited to secondary structures such as floorboards and engine cowlings due to limited experience with designing composite structures. However, as the mechanics of composite materials became better understood and higher quality materials were developed, its use increased as primary aircraft components such as flaps, wing sections, and even as the entire fuselage.

Currently, aircraft exist that have a fuselage and wings made substantially or entirely from composite materials. Aircraft manufacturers have increased their dependence upon composite materials to meet their ever-increasing demands for improved efficiency and lower costs. Composite materials also are used in automotive, recreational, military and defense applications, where the performance requirements may be even more demanding.

A significant drawback to the use of composite structures in aerospace applications, whether commercial or military, is the complicated and expensive tooling that is required for their fabrication, particularly when a seamless, hollow structure is desired. To form a seamless, hollow composite structure, the use of a mandrel or mold core is often preferred. The composite materials, generally fiber and resin, are laid up on the mandrel and cured by applying heat, time and pressure according to well-known methods. For many applications, the mandrel is a single use mold/tool that is destructively removed from the finished part either by a chemical process or by mechanical agitation.

Mandrels for composite structures are often made of plaster. Plaster easily pours into a mold and forms a solid structure but requires a significant curing time. Moreover, plaster is generally removed by mechanical agitation which can result in damage to the composite structure, after which the material is discarded as waste.

Other conventional materials used for making tooling such as mandrels include eutectic salts. These materials pose certain processing problems associated with removal of the materials from the cured parts, as well as with the disposal of the materials. Salt mandrels are brittle and must be cast into the desired shape while molten to avoid the need to machine them. Moreover, despite being soluble in water, eutectic salts produce corrosive, environmentally unfriendly waste streams when washed from the cured composite part.

In closed mold processes, core and mandrel materials used to form complex shapes must withstand a range of pressure and temperature extremes. These are typically made from polymer foams or balsa wood. They are typically molded inside the part to strengthen and stiffen the structure (much like honeycomb) but they are sometimes removed (solvent or bead blasting) when component weight is critical. Foams must have compressive strengths that are greater than the resin injection pressure to resist crushing. Localized crushing can create a non-visible resin rich area. Residual pores can absorb resin adding undesirable weight.

Melt out materials include salts, waxes (150° C.) and low melting point alloys (140-180° C.). Waxes cannot operate under high temperature conditions and alloys are expensive, heavy, and contain toxic heavy metals. Alloys can require extensive surface preparation and special melt out procedures.

More recent improvements in mandrel materials provide organic and inorganic binders that are environmentally benign and water-soluble. The mandrel material is a composite blend including a matrix, such as sand, a binder, and water. The composite blend is prepared to a desired consistency, formed into a desired shape and cured. The resulting mandrel is strong and lightweight and easily can be shaped and subsequently removed from cured composite parts. Additives may be added to enhance the functional characteristics of the finished tooling material.

Utilizing the above processes, mandrels are currently formed using similar techniques, which involve the use of either a pourable material, such as eutectic salt or plaster, or a compressible material such as PVA and aggregate or sodium silicate and aggregate. Each of these processes can be very labor and time intensive.

Eutectic salts mandrels require the salt to be melted at temperatures in excess of 350° F. and, once molten, must be manipulated into a mold where it must cool and set for extended periods of time, often causing burns unless special protective clothing is worn. Further depending on the complexity of the mold and exposed cross section, significant amounts of water and time are needed to remove the eutectic salt from the mold, which also creates a highly corrosive waste stream.

Plaster is a more user friendly material, in that it can be prepared at room temperature and poured into a complex mold, but it also has several disadvantages. Since plaster is formed from the hydration of dehydrated salts, it is prepared from a dry powder material that is combined with water, which must be agitated to ensure proper mixing of the powder and water. This agitation leads to the formation of air bubbles within the material that can form significant defects in the resultant mandrel. Further, the plaster must be allowed to set, which is controlled by the temperature that the plaster is mixed at, as well as by additives to the mixture. Since this is normally a manual process, set times are around 10 min and can take as long as 45 min. Once set, the mandrel can be removed from the mold, but is not ready for composite layup, since it still contains significant amounts of water. This water must be removed to a sufficient level so as not to react with the composite system when the part is brought to temperature. Plaster is extremely time and energy intensive to dry since it forms a dense egg shell like skin, which acts as a heat and water barrier. Once a finished composite part is formed, the plaster material is either partially or completely water insoluble. Mechanical methods are then used to remove the mandrel often damaging the composite due to delamination.

Prior works have attempted to produce a water-soluble plaster material that aids in the removal of the core from the finished composite part, but has come at the cost of reduced strength in the core. Further since these water-soluble plasters still incorporate large amounts of water to pour the material there is a significant amount of time and energy needed to cure and dry the core.

Existing compressed material mandrels are comprised of moist sand-like materials that are packed or compressed into a mold to form the required shape. These materials can be labor intensive or require expensive tooling since the materials must normally be packed at high pressure to ensure uniformity in the mandrel. Further, complex shapes are very difficult to form since the materials are not very flowable and, as such, don't tend to fill molds with reverse cavities. However, since these materials start out with a very low density and open porosity, they can be readily dried or cured using a variety of techniques, for example CO2 curing, hot gas infiltration, vacuum drying, microwave or oven drying. These materials are highly porous and surface sealing methods do not withstand resin infusion processing.

While these prior art practices provide improvements that have shortened processing time and overall costs, the manufacturing cost of a composite structure is still relatively high. Consequently, there remains a need for a simplified method for manufacturing composite parts.

SUMMARY

One aspect of the invention relates to a series of formulations developed based on an organic binder material that is water-soluble, at least one melt processing aid capable of reducing the glass transition temperature of the organic binder, and an aggregate material. In some embodiments, the formulations include polyvinylpyrrolidone (PVP) as the organic binder, at least one of Poly(2-ethyl-2-oxazoline) (PetOx) and polyethylene glycol (PEG) as the melt processing aid, and sodium chloride (NaCl) as the aggregate material. The PVP is used as the base soluble binder since it has a high glass transition temperature (Tg). The other polymer additives not only plasticize the PVP but allow lower temperature processing for mixing and mandrel forming. Aggregates provide mechanical reinforcement and thermal stability. They may be soluble or insoluble. Soluble aggregates are ideal to enhance bulk mandrel solubility.

An exemplary embodiment provides a composition for use in manufacturing a water-soluble tooling material. The composition comprises an organic binder material, a melt processing aid, and an aggregate material. The organic binder material is water-soluble. The melt processing aid can be capable of reducing the glass transition temperature of the organic binder. The aggregate majority is soluble.

In any of the embodiments disclosed herein, the organic binder material can comprise polyvinylpyrrolidone.

In any of the embodiments disclosed herein, the melt processing aid can comprise at least one of Poly(2-ethyl-2-oxazoline) azide (PetOx) and polyethylene glycol (PEG).

In any of the embodiments disclosed herein, the composition can be provided as a mixture configured for use in a resin transfer molding (RTM) apparatus.

In any of the embodiments disclosed herein, the composition can be provided as a mixture configured for use in a 3D printing apparatus.

In any of the embodiments disclosed herein, the mixture can have a fraction of aggregate from about 50% to about 99% by volume.

In any of the embodiments disclosed herein, the composition can comprise, by volume, from about 1% to about 35% polyvinylpyrrolidone.

In any of the embodiments disclosed herein, the composition can comprise, by volume, from about 1% to about 20% PetOx.

In any of the embodiments disclosed herein, the composition can comprise, by volume, about 1-20% PetOx, about 3-70% polyvinylpyrrolidone, and about 20-90% aggregate material.

In any of the embodiments disclosed herein, the composition can comprise, by volume, about 10% PetOx, about 20% polyvinylpyrrolidone, and about 70% aggregate material.

In any of the embodiments disclosed herein, the aggregate material can be selected from a group consisting of: Plaster of Paris, sand, graphite fibers or other carbon, fly ash, fly-ash components, glass spheres or beads, hollow-spheres, cenospheres, talcum, calcium carbonate, fused silica, garnet, sodium chloride, calcium chloride, potassium chloride, potassium nitrate, potassium nitrite, sodium nitrate, sodium nitrite, copper chloride, lithium chloride, lead chloride, magnesium chloride, barium chloride, calcium chloride alumina, aluminum tri-hydrate, sugars, and combinations thereof.

In any of the embodiments disclosed herein, the organic binder material can comprise a protein.

In any of the embodiments disclosed herein, the aggregate material can comprise sodium chloride.

In any of the embodiments disclosed herein, the organic binder material and the melt processing aid can be provided in aqueous solution.

In any of the embodiments disclosed herein, the melt processing aid can be present in an amount sufficient to enable moldability of the organic binder.

Another exemplary embodiment of the present invention provides a composition for use in manufacturing a water-soluble tooling material using a resin transfer molding apparatus. The composition can comprise, by volume: about 5-20% PetOx, about 5-25% PVP, and about 60-90% aggregate.

In any of the embodiments disclosed herein, the composition can further comprise, by volume, about 0.1-3% PEG.

In any of the embodiments disclosed herein, the composition can comprise, by volume: about 15% PVP, about 15% PetOx, and about 70% NaCl.

In any of the embodiments disclosed herein, the composition can comprise, by volume, about 13% PVP, about 7% PetOx, and about 80% NaCl.

Another exemplary embodiment of the present invention provides a mixture for use in manufacturing a water-soluble tooling material using a resin transfer molding apparatus. The composition can comprise, by volume: from about 1% to about 20% of a water-soluble melt-processing aid, from about 3% to about 30% organic binder, and from about 50 to about 90% aggregate material.

Another aspect of the invention relates to the production of complexly shaped mandrels with high precision by resin transfer molding (RTM). According to this aspect, in an exemplary embodiment, a method for resin transfer molding comprises providing a preform or mat having a shape of a finished product, placing the preform or mat into a mold cavity having the shape of the finished product, closing the mold cavity, injecting a particulate mixture into the closed mold cavity under pressure, the particulate mixture including an organic binder material that is water-soluble, a melt processing aid capable of reducing the glass transition temperature of the organic binder, and an aggregate material, and curing the injected particulate mixture.

In any of the embodiments disclosed herein, the finished product is a mandrel.

In any of the embodiments disclosed herein, the preform or mat includes a fibrous material.

In any of the embodiments disclosed herein, the organic binder material comprises polyvinylpyrrolidone and the melt processing aid comprises at least one of PetOx and PEG.

In any of the embodiments disclosed herein, the particulate mixture comprises about 5-20% PetOx, about 5-20% PVP, and about 60-90% aggregate material.

Still further aspects of the invention relate to methods of manufacturing composite structures wherein the mandrel materials can be water-soluble. Moreover, aspects of the invention allow for the reclamation of mandrel materials for reuse to further reduce costs and increase thermal stability.

The products and methods described herein are especially useful for forming mandrels for producing lightweight composite structures, e.g. for the transportation industry, such as aircraft or aerospace industry, and will be described in connection with such utility, although other utilities are contemplated.

BRIEF DESCRIPTION OF DRAWINGS

To understand the present invention, it will now be described by way of example, with reference to the accompanying drawings in which.

DETAILED DESCRIPTION

Further features and advantages of the present invention will be seen from the following detailed description, in which is shown various embodiments of the present invention. It is understood that other embodiments may be utilized and changes may be made without departing from the scope of the present invention.

The present invention relates to devices and methods for forming mandrels for use in the production of hollow composite structures, which devices and methods may be used for mass production of such mandrels. The mandrels are typically made from a salt or other soluble aggregate held together in the desired shape by means of a binder, and may include additional ingredients as well. In one embodiment, the process used to form the mandrel comprises mixing the aggregate with the binder and forming the mixture into the desired shape using heat or pressure or a combination of heat and pressure so the mixture reaches a sufficient mechanical stability for mandrel to be function in composite processing.

RTM core is a washout tooling material that utilizes a water-soluble polymer (e.g. PVP). It is based on high molecular weight PVP which has a very small gap between its glass transition temperature (Tg) and its thermal cross-linking temperature. So it is generally not melt processable like conventional thermoplastics (ex. HDPE, ABS, Nylon, PC). Disclosed herein is a system of additives (e.g. plasticizers, release agents, and soluble aggregates) that enable the PVP to be formed (injection or pressure molded) like conventional thermoplastics but still operate at higher temperatures and washout with tap water. Self-releasing properties can be engineered into the system. This will eliminate the challenges with existing porous tooling, non-rigid tooling (bladders), leave-in cores (foams), solvent baths, and release coatings/films. The disclosed soluble binder system is melt processable and reinforced with high temperature soluble aggregates to add strength and enhance solubility. The binder to aggregate ratio is high enough to create a non-porous, high strength body.

In various embodiments of the present invention, an aggregate material, a binder material, and a melt processing aid are mixed to form a non-fluid aggregate/binder/processing aid mixture. It is understood that the aggregate material, the binder material, and the processing aid material can contain more than one aggregate, binder, or aid respectively. This aggregate/binder/processing aid mixture may have a (dry) hard granular consistency at room temperature in some embodiments. The mixture can then be directed/injected into a mold in a similar fashion to a molten polymer. As the material enters the mold, the non-fluid mixture remains and is contained within the mold, filling the mold. Such techniques can afford the fast production of aggregate based mandrels that can be readily be formed using a host of processes as described below.

In different embodiments, the mold can be configured with either horizontal or vertical parting lines. Additionally, in one embodiment, the mold has a single parting line, but in other embodiments, the mold may have multiple parting lines. For example, a mold with multiple vertical parting lines may include multiple injection devices to accelerate the process. Some mandrel shapes, however, may be better suited for production in horizontal parting line molds. For example, horizontal parting line molds may be more suitable when large mandrels are to be produced in one mold, so that the cavity for forming the mandrel extends relatively far from the injection means. Similarly, if several mandrels were to be made simultaneously using a mold with multiple cavities, a horizontal parting line mold may offer better performance.

The mixture is injected into the mandrel mold by an injection means, such as the injection means discussed above. The injection means may utilize compressed air, gravity, hydraulic pressure, or any other means capable of mobilizing an aggregate/binder/processing aid mixture. The injection means may additionally be used to inject the mixture into multiple molds at a time.

Figure 1:
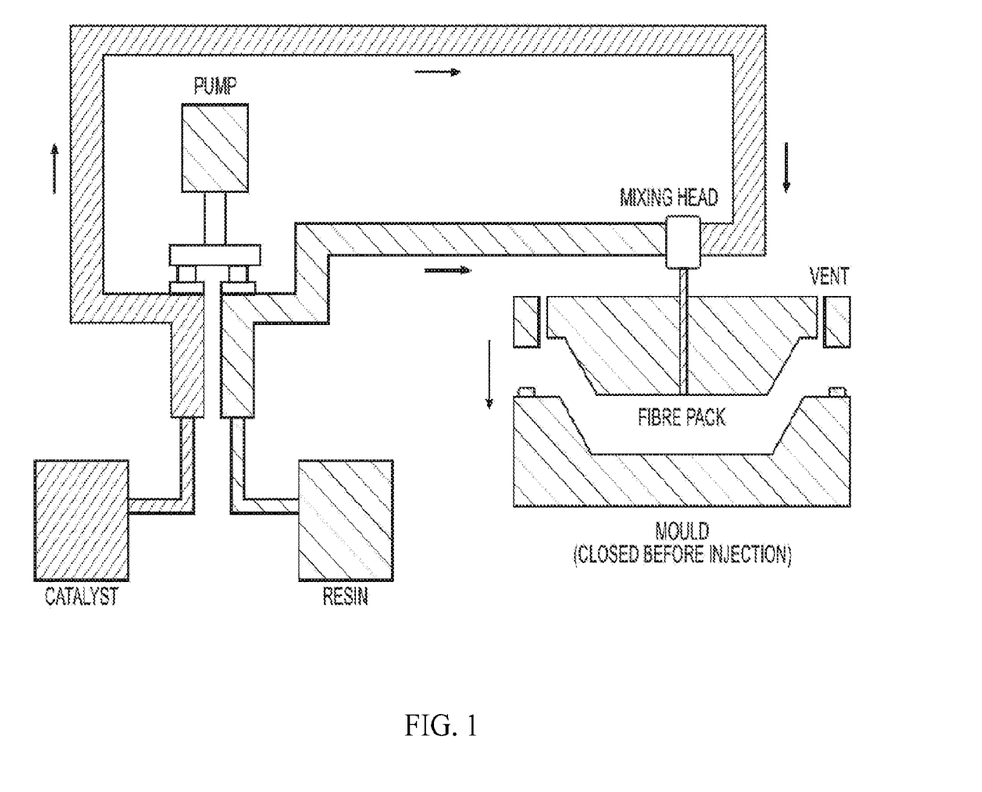
FIG. 1 is a schematic diagram of one embodiment of a system for mandrel fabrication using a RTM process.

Once the mold has been filled with the aggregate/binder mixture, one or more processing methods can be adopted to process the mandrel into a desired state for use in polymer or composite manufacturing. Generally, the filled mold is treated to activate the binder in the mixture or to otherwise harden the mixture such that the mandrel retains its shape upon being removed from the mold. In one exemplary embodiment, the process of treating the mandrel is designed to take a very short period of time, such as on the order of seconds, so that the formed mandrel may be removed from the mold and the mold may be filled again rapidly, facilitating a process capable of being used to mass produce mandrels. In certain embodiments, the entire process of molding the mandrel can take less than two minutes, and in some embodiments, less than one minute. Depending on the composition of the mixture used, and, in particular, the type of binder(s) used, the mandrel may be treated initially by one of a number of methods Other aspects of the present invention relate to a method for forming a composite structure using a mandrel, wherein the mandrel is mass produced in a mold by filling the mold with a particulate mixture, including one or more aggregates, one or more binders, and one or more melt processing aids, and removing the formed mandrel from the mold once cooled. As shown in FIG. 1, the resin transfer molding process is a closed mold process in which a fabric layup can be placed inside a tool, the tool then closed. Resin is pumped or injected into the closed tool. This can be done at low pressure (e.g. 50-100 PSI) or at high pressure (e.g. >2000 PSI). The fabric layup can be a preform or a mat. In some embodiments, the preform or mat can have a shape of a finished product. Moreover, the preform or mat can include fibrous materials. In some embodiments, the tool can be a mold cavity. The mold cavity can also have a shape of a finished product. As the material enters the mold cavity, air in the mold cavity can be removed through properly placed vents while the material is contained in the mold cavity. Since RTM utilizes a closed tool, it produces a tooled surface on all sides. A vacuum can be formed around the tool using the inner molding line (IML). Composite pre-impregnated fabric (pre-preg) can be layered around the tool, bagged, and put under vacuum to laminate and consolidate fabric layers. In some embodiments, the finished product can be formed in a block geometry. The finished product can be highly machinable.

According to further aspects, the mandrel may be fully set or cooled by any suitable cooling technique. Once the part is cooled, it can be removed from the tool. In some embodiments, the resulting core can be crosslinked via thermal or chemical means to enhance thermal stability though. In other embodiments, the binder/aggregate mixture can be formed into an extrudable filament so mandrels can be produced by 3D-printing.

In one exemplary embodiment, the mandrel material mixture contains a primary binder provides good strength and desirable properties and a melt processing aid that plasticizes the primary binder to permit workability (e.g. meltability, malleability) of the PVP in the mold. As described above, the primary binder can be hardened after removal, leaving the mold free for production of additional mandrels, increasing production rate. In one embodiment, the mixture includes a primary binder that is water-soluble, such as polyvinyl pyrrolidone (PVP) and melt processing aid that can lower the glass transition temperature of and hence soften the PVP for use in the mold.

A mandrel mixture composition according to the present invention may typically include salt (e.g. NaCl) and/or other aggregate(s), a binder or combination of binders, and possibly additional additives to improve the characteristics of the mandrel in a particular application. The amount of binder utilized can be determined by the desired ultimate strength, porosity, thermal properties, mold removal enhancement, etc.

Various different aggregates, or combinations thereof, may be used in different embodiments of the binder/aggregate/processing aid mixture. Sodium chloride is one suitable choice for the aggregate component of the mixture because of its availability and its ability to enhance mechanical properties and accelerate washout. However, other aggregates may be chosen for various reasons, such as their compatibility with a particular binder, their consistency, solubility, thermal expansion, or their capacity to undergo a reclamation process after being removed from the finished composite structure. Examples of other particulate materials which may be employed as aggregates or as additives include glass or polymer microspheres, calcium chloride, nitrites, nitrates, carbonates, pumice, graphite or coke particles, expanding microspheres, expandable graphite, small steel shot, glass beads or bubbles, small polypropylene pellets, alumina, cenospheres, and clays. A combination of two or more of these materials may also be used. Particle size is often directly related to surface quality, aggregate density, and packing density, and in one embodiment, particle sizes of between about 100 microns and about 5000 microns are utilized (e.g. 500-700 microns (medium), 1500-3000 microns (coarse)). The resultant aggregate density can vary from about 0.4 to about 3 g/ml, in one embodiment. Higher aggregate densities can result in higher compaction, but may not be ideal for some applications, since particle size also plays an important role. Other density considerations may include mandrel geometry, since higher density aggregates can result in higher stresses being exerted on the mandrel.

A binder or combination of binders can be chosen based on a number of factors, including the duration of time required to treat the mandrel until it reaches a level of hardness to allow handling, the tensile strength of the binder in connection with the chosen aggregate when fully cooled, the cost of the binder, the viscosity of the mixture when the binder and aggregate are combined, the water-solubility of the binder, and the environmental byproducts of the curing and removal processes. Ultimately, the proper binder can be determined with reference to the specific properties necessary for the finished composite part. Compressive strengths for this type of mandrel are usually on the order of 1500-2000 PSI. These binders include, but are not limited to, PVP, PetOx, PEG, etc.

As described above, in one exemplary embodiment, a water-soluble hybrid binder/processing aid composition includes PEG, PetOx, and PVP. For example, such compositions can range from about 0-3% weight PEG, 1-20% weight PetOx and about 1-30% weight PVP, in various embodiments with the remainder being comprised of aggregates and/or additives. Specific binder compositions and ratios may vary, dependent on factors such as the aggregate type and size and the effective surface area of the binder. In many embodiments of hybrid compositions, the organic component affords a mandrel with better machinability, which also is capable of attaining higher strengths for demanding applications. PVP is one such suitable organic binder, due to properties such as water-solubility, low viscosity, and high tensile strength. Many other water-soluble binders may be used with other embodiments, including but not limited to various salts, phosphates, gelatins, water-soluble hemicellulose, water-soluble polymers, and poly vinyl alcohol.

Various specific compositions have been found to have advantageous properties when used in connection with the production methods described herein. One exemplary binder/aggregate composition includes about 10-30% PVP, about 0-3% PEG, about 10-30% PetOx, and about 70-77% sodium chloride. This composition produces the strength and thermal stability to meet process requirements, its unique composition endows it with a non-porous, self-releasing surface that is also water-soluble. Since RTM core is a thermoplastic based material, it is suitable for high rate production. This produces an affordable tooling system that simplifies the tool manufacturing and extraction for complex shaped RTM produced composites. Additionally, the mandrels resulting from this composition generally have good surface finish and water solubility. Another exemplary composition includes about 2% PEG, about 13% PetOx, about 15% PVP, and about 70% sodium chloride. Additionally, the mandrels resulting from this composition generally have good surface finish and are highly water-soluble. A further exemplary composition includes about 1% PEG, about 9% PetOx, about 13% PVP, and about 77% sodium chloride.

Additives may be used to enhance the performance of the mandrel and materials in any of the above embodiments. For example, plasticizers and/or rheology modifiers that could be used to modify or adjust the processing behavior of PVP include: water, low MW PVP, carboxymethylcellulose cellulose acetate, cellulose acetate propionate, dibutyl tartrate, diethylene glycol, dimethyl phthalate, 2-ethylhexanediol-1 3, glycerin, glycerylmonoricinoleate, lgepal CO-430 (Solvay), oleyl alcohol, Resoflex R-363 (Broadview Technologies), shellac sorbitol, PEGs, etc.) Less than 1% additives is necessary in many exemplary compositions. Minor amounts of other additives, such as surfactants, may be present. The surfactants may be anionic, nonionic, cationic, amphoretic or mixtures thereof. Examples of water-soluble surfactants are anionic surfactants selected from organic sulphates, organic sulphonates and organic phosphate esters, e.g., potassium 2-ethylhexyl phosphate. Certain surfactants also operate as flow control agents. Other additives include humidity resistant additives, collapsibility (or breakdown) enhancers, preservatives, dyes, bulking agents, hot strength additives, or flow enhancers. Humidity resistant additives include, for example, potassium tetraborate, zinc carbonate, zinc oxide. Collapsibility (or breakdown) enhancers include, for example, sugar, e.g., sucrose, dextrin and sawdust. Refractory coatings, such as silica in a solvent, may be used to impart a finished surface to the mandrel. Low surface energy additives, such as PTFE, may be added to enhance self-releasing properties. Of course, the additives may be added in combination or singly.

Preservatives may be added to prevent mold and spoilage of the binders during storage. Amounts of such preservatives will vary depending upon the preservative employed, but generally, amounts up to about 1 percent by weight are considered sufficient. In one embodiment, sodium benzoate is used as a preservative, and is typically utilized in an amount of about 0.2 percent based upon the weight of the binder. Essentially any preservative which is compatible with the binder and various other additives and which is environmentally safe can be used in the present invention.

After treating and removing from the mold, a mandrel may require machining or other processing to form the desired shape. Depending on materials used and their cooling parameters, further cooling may be required prior to machining the mandrel.

The invention further relates to methods for manufacture of composite or polymer parts or components, including complex parts such as ductwork which provides a passageway for channeling air, gases, fluids, wiring or the like. The type of composite or polymer product is, however, not a limiting feature of the invention. One aspect of the invention is the ability to manufacture composite parts at efficient rates, so that the parts can be effectively mass produced in an economic manner. In general, polymer or composite materials (including precursor materials) are placed into contact with the mandrel in order to impart the shape of the mandrel to the final polymer or composite product. One such production method involves wrapping the mandrel with materials to produce the final product. The mandrel can also be used for a range of other known processing techniques like plastic injection, VARTM, etc.

By way of example, in producing a composite product, a preformed mandrel of the type described above may be wrapped with or otherwise coated with a polymer or composite material (which may include precursor materials). The coated material may then be set by any suitable setting means, such as by heating. Techniques for setting such polymer or composite materials are known in the art and vary by the type and nature of materials used. Then the mandrel may be removed, for example by solubilizing in water, to open a formed passageway in the formed part. The mandrel, having been formed by efficient production speed techniques coupled with its use as a means to form the internal configuration of composites which are processable at efficient production speed levels enables the economic production of polymer or composite parts. The production efficiency can be further enhanced by the ability to remove the mandrel material from the composite part quickly, efficiently and without damage to the formed composite, such as through the use of water-soluble binders. Making the mandrels and using them with composites thus enables economic manufacture of complex composite and polymer parts, particularly those having complex internal hollows, chambers and passageways. For example, components such as airducts and hollow structural components such as air frames, bikes and bike frames, car frames, and plane hulls can be manufactured using composite materials using the mandrels and methods described herein. Parts may be produced using the principles described herein for use in motor vehicles, boats, bicycles and other transportation vehicles, as well as other structures for various other industries. Examples of composite materials that can be used in accordance with embodiments of the invention include epoxy- or phenolic-based polymer binders impregnated into different fiber systems, such as fiberglass, Kevlar, carbon, etc. It is understood that these examples of components and materials are not exhaustive, and that a wide variety of components and materials can be manufactured.

After the mandrel has been fully cooled, it can then be used for producing a finished composite or polymer part. A release layer may be applied to the mandrel before part production, such as in the form of a sealer, which stops the resin/polymer systems of the composite or polymer product from penetrating the mandrel material. For example, the mandrel can be covered with a polymer-impregnated fiber to create a composite form of the desired shape. Once in the desired shape, depending on the utilized resin/polymer system, the part may be cooled, for example by using any suitable cooling technique. After reaching the desired cooled state, the composite part is then ready for mandrel removal. The part can be cooled using any known technique, depending on the material. The mandrel can be removed using a range of techniques from mechanical agitation to water dissolution, depending on the binder/aggregate composition. In one embodiment, where the mandrel includes a water-soluble binder composition, the mandrel is solubilized by application of water thereto, which breaks up the mandrel and washes away the insoluble components of the mandrel, without damaging the produced article. The final product is a finished composite part and the removed mandrel materials. In one embodiment, the aggregate and water may be reclaimed upon removal of the mandrel from the finished composite structure.

The invention further relates to methods for removing a mandrel from a finished composite part after the product has been molded and cooled. Where a water-soluble binder is used, mandrels may be removed from a finished composite structure by exposing the binder and aggregate particles to an effective amount of water to dissolve the binder and disintegrate the mandrel, and then removing the aggregate particles from the cavity of the molded product. The environmental impact of water-soluble binders may be considered in choosing a method for removing the binder material, as not all of the byproducts of water-soluble binders are environmentally benign.

In one embodiment, the water may be sprayed into the structure at high pressure to remove the mandrel material more quickly. Alternatively, the water may be heated to a temperature below boiling which may dissolve particular binders more quickly. Yet another alternative would be to jet a stream of water into the finished composite structure to break the bonds of the water-soluble binder, and then removing any remaining mandrel material either with water directly or by mechanical agitation. Each of these methods can be performed in less than 60 minutes for most mandrels, and many mandrels may be fully removed in less than 30 minutes.

With certain binders, the rate at which the bonded salt mandrel is weakened by exposure to water may be accelerated by pretreatment of the salt mandrel. In some exemplary embodiments, this pretreatment involves immersing the salt mandrel in a dilute alkaline solution or hot water for from one to ten minutes, drawing the alkaline solution or water through the mandrel, and/or blowing steam through the mandrel. The alkaline treatment is particularly suitable for composite materials which are not affected by alkali. Examples of useful solutions for this method include dilute alkaline solutions of sodium hydroxide, potassium hydroxide or sodium carbonate, which are relatively benign and relatively inexpensive.

Mechanical agitation also may be used to remove the mandrel from the composite structure. In one embodiment, the mandrel may first be conditioned by steam, water, or some other removal agent to initially break at least some of the bonds of the mandrel. A mechanical means may additionally or alternately be provided to break the mandrel into pieces while within the composite structure. Once the mandrel has been weakened by chemical or mechanical means, the finished composite structure is agitated by shaking or some other method to remove the rest of the mandrel material. This is a typical method of removal for most non-water-soluble binders, including various organic compounds and phenolics.

The invention also relates to mandrels produced using the above materials, methods, and machines. In one embodiment, a mandrel produced as described above includes a water-soluble organic binder, one or more melt processing aids, and one or more aggregate materials, such as sodium chloride, etc., as described above. It is understood that various embodiments of the mandrels described herein may contain any of the materials and additives described above for use in manufacturing the mandrels. Additionally, the mandrels manufactured as described herein can be used for the methods of forming composites described herein.

In some applications, a mandrel with a minimal amount of expansion during heating, i.e. a low CTE, can be desirable. In other applications, a mandrel that can expand can be useful. In an embodiment, the mandrel can be used to compress a composite material into a composite structure having a desired shape, and then can be easily removed to provide the final composite structure. Because the mandrel can be used to form a hollow composite structure, with no residual material left within the composite structure, the mandrel allows for the construction of composite materials in specific configurations with no additional weight or material left in the composite. This lack of weight is particularly advantageous in applications where every reduction in weight can be advantageous, such as for example, high performance materials in automotive and aircraft parts. Similarly, the construction of a hollow structure with no residual material on the interior can produce structures in which the inside can be used as a channel, tube, passageway, or pass-through for materials, gases, fluids, wires, rods, and other items or materials.

In an embodiment of the disclosure, the mandrel can be composed of a binder that binds the material to form the mandrel. The binder can be any binder known to one of skill in the art. In an embodiment, the binder can be an organic binder, such as an organic polymer, a water-soluble organic polymer, or water-soluble organic macromolecule. Non-limiting examples can include water-soluble polymers such as poly(2-ethyl-2-oxazoline), polyvinyl alcohols, PVP, gelatins, water-soluble hemicelluloses, long alkyl chain organic salts, inorganic salts, silicates, phosphates, and so forth. More than one binder can be included in the mandrel, including more than one organic binders.

In an exemplary embodiment of the disclosure, the binder can be a water-soluble binder. The phrase "water-soluble binder" can describe a binder that one of ordinary skill in the art would know to dissolve in water. The water-soluble binder can be very soluble in water or only partially soluble in water. Washing the mandrel with water can lead to the complete removal of the water-soluble binder and the other components of the mandrel from the composite structure. When the binder dissolves, the remaining materials in the mandrel no longer remain in place and can be washed out of the mandrel. By way of example, a mandrel can be created using a water-soluble binder, a filler material and an expandable material. After heating to expand the mandrel via to the expandable material, the mandrel can be washed with water dissolving the water-soluble binder, and as a result rinsing away the filler and the expandable material. Because the mandrel contains a water-soluble binder that allows for removal of the mandrel from a composite structure, the mandrel be described in an embodiment as a water-soluble mandrel.

In an embodiment, the mandrel can also optionally contain a filler material. The filler material can be any filler known to one of ordinary skill in the art as a material for preparing a mandrel. The filler can be a low density aggregate material, including but not limited to Plaster of Paris, sand, silica, carbon, fly ash, fly-ash components, hollow-spheres, talcum, calcium carbonate, fumed silica, sodium chloride, or aluminum tri-hydrate etc.

Figure 2A:
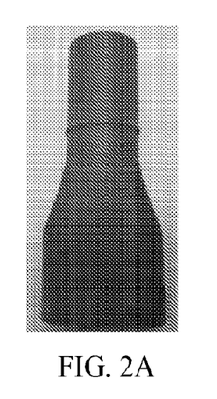
FIG. 2A is a photo of exemplary embodiments of a mandrel and a process according to the present disclosure.
Figure 2B:
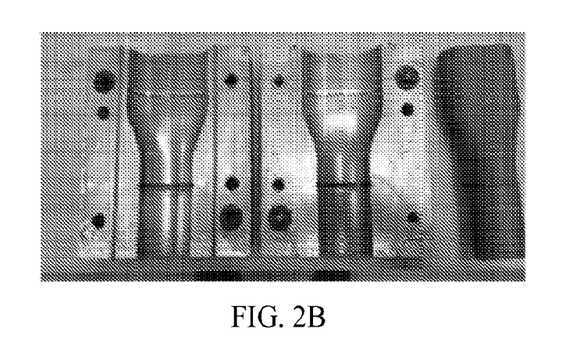
FIG. 2B is a photo of exemplary embodiments of a mandrel and a process according to the present disclosure.
Figure 2C:
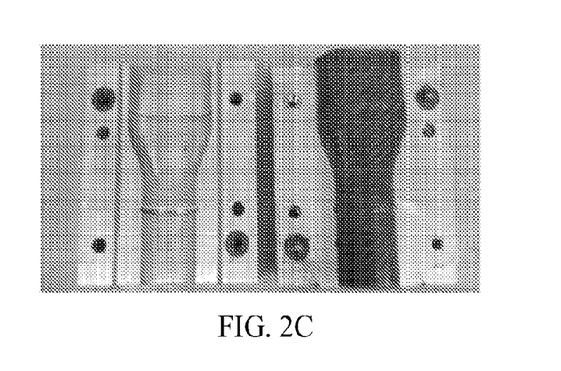
FIG. 2C is a photo of exemplary embodiments of a mandrel and a process according to the present disclosure.

Using the mandrel set forth above, exemplary embodiments of this disclosure can be described more fully in the steps of various processes that can be used to prepare mandrels and composite structures, as shown in FIG. 2A. A composite structure can be prepared by initially creating a tool or mold that has inner dimensions that correspond to the desired outer dimensions of composite structure. An exemplary non-limiting tool is shown in FIGS. 2B-2C. The tool or mold can be used to create the mandrel by mixing the desired components of the mandrel and adding the mixture to the tool, then curing the mandrel using standard methods.

Figure 2D:
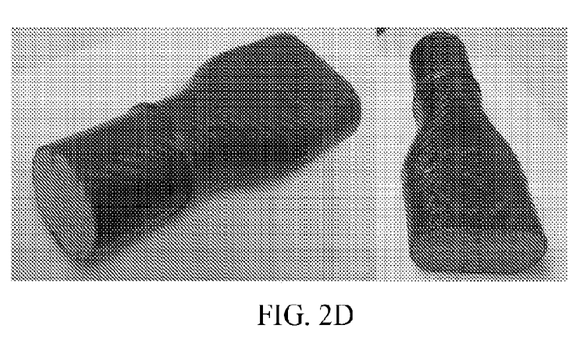
FIG. 2D is a photo of exemplary embodiments of a mandrel and a process according to the present disclosure.

The mandrel can be coated with a composite material and placed within the tool, as shown in FIG. 2D. The mandrel can optionally be covered with a sealer prior to coating with the composite material in order to limit mixing or penetration of the composite material and the mandrel. The composite material can be any material used to make a composite structure. For example, the composite material can include a thermosetting compound, including a thermosetting resin; a thermoplastic compound, including a thermoplastic resin; or one or more layers of carbon fiber mesh. The composite material can also be more than one type of composite, and can be mixed together or layered on the mandrel. An advantage of the disclosed process is that the mandrel, as it expands, can compress separate composite layers together during a curing step. Any material that can be formed in a tool or mold can be used in conjunction with the disclosed system.

The mandrel and composite material can be enclosed within the tool or mold as shown in FIG. 2B and FIG. 2C, and heated to a desired temperature. During heating the material in the mandrel can expand and can compress and/or hold the composite material against the inner surface of the mold, allowing the material to cool to form the composite structure. The temperature for heating can be any temperature that can cause thermal stability and that can cause the composite material to form the composite structure.

PetOx and PEG are thermally stable to 380° C. and 177° C., respectively. In some embodiments, a high shear mixer can be used at 140-170° C. to create RTM core materials. The choice of temperature can be varied based on the type of materials being used. Modifying the PVP with melt processing aids is necessary to allow melt processing, but it may result in reduced thermal stability due to the reduction in glass transition temperature (Tg). However, since PVP begins to crosslink in air above 150° C., it may be possible to regain some thermal stability. Short exposures to temperatures below 150° C. result in little cross linking but the reaction proceeds significantly faster with exposures in the 180-200° C. range. Therefore, the plasticized material can be melt processed in the 140-160° C. range and form a mandrel shape under similar temperatures. The mandrel may then be heated to 180-200° C. to initiate thermal cross linking. The deliberate cross linking may mitigate the effect of the processing aids (decreased Tg). Since the formulations utilize a soluble aggregate, the remaining material will be removable via a combination of dissolution of PVP and disintegration of the PVPP (crosslinked PVP). In addition, additives could be used to induce chemical crosslinking of the PVP binder.

Once heating is complete, the tool, mandrel and composite structure can be removed from the oven or furnace, as shown in FIG. 2D, and cooled. The ends of the composite structure and mandrel can be trimmed on the ends, as also shown in FIG. 2D. The mandrel and composite structure can be removed from the tool or mold and rinsed with water to remove the mandrel. Because the mandrel can be prepared with one or more water-soluble binders, the mandrel can be rinsed out of the composite structure using any water source, including common tap water.

In an embodiment, the disclosure can describe a process for preparing a composite structure, including the steps of preparing a tool or mold, preparing a mandrel having external dimensions somewhat smaller than the internal dimensions of the tool or mold, spreading a composite material that will form the composite structure onto the surface of the mandrel, and heating the composite material and mandrel in the tool or mold to prepare the composite structure. The process can further include removing the mandrel from the inside of the composite structure by rinsing with water.

One advantage of the disclosed mandrel includes increased dimensional stability. The formulations disclosed above have been tested under compression and exhibited strengths on the order of 2000-2500 PSI. Several small cylindrical samples have been processed using a room temperature 80 PSI resin injection process and a 250° F. post injection cooling. The results of these tests showed the core has excellent dimensional stability under injection conditions.

Another advantage of the disclosed mandrel includes improved washout tooling. Because it is formed without a liquid carrier (e.g. water or solvent), the cost and energetics of removing the liquid after forming, defect generation due to associated with removing the liquid, loss of tolerances due to removing the liquid (warping, shrinkage), and rate limitations due to liquid removal and strength development are each eliminated.

Still another advantage of the disclosed mandrel includes its non-permeability (non-porosity). This permits the mandrel to be engineered to be self-releasing. Accordingly, the non-permeability eliminates the material costs of surface sealers (e.g. tapes and coatings) needed to prevent process liquid infiltration (e.g. resins and liquified polymers). It also eliminates the materials costs to apply release agents when the contact surface is deemed process compatible, the costs associated with applying sealers and release agents, and the costs and production rate lost due to scrap associated with sealer and release failures.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. All component percentages described herein refer to weight percentages, unless specifically identified otherwise. Accordingly, while the specific embodiments have been illustrated and described, numerous modifications come to mind without significantly departing from the spirit of the invention and the scope of protection is only limited by the scope of the accompanying claims.

We claim:

1. A composition for use in manufacturing a water-soluble tooling material, comprising:
   an organic binder material that is water-soluble;
   a melt processing aid capable of reducing the glass transition temperature of the organic binder; and
   an aggregate material,
   wherein the organic binder material and the melt processing aid is provided in aqueous solution.

2. The composition of claim 1, wherein the organic binder material comprises polyvinylpyrrolidone (PVP) and the melt processing aid comprises at least one of Poly(2-ethyl-2-oxazoline) (PetOx) and polyethylene glycol (PEG).

3. The composition of claim 1, wherein the mixture has a volume fraction of powder from about 50% to about 99%, by volume.

4. The composition of claim 1, wherein the composition comprises, by volume, from about 1% to about 35% polyvinylpyrrolidone and from about 1% to about 20% PetOx.

5. The composition of claim 1, wherein the composition comprises, by volume, about 155% PetOx, about 3-70% polyvinylpyrrolidone, and about 20-90% aggregate material.

6. The composition of claim 1, wherein the composition comprises, by volume, about 10% PetOx, about 20% polyvinylpyrrolidone, and about 70% aggregate material.

7. The composition of claim 1, wherein the aggregate material is selected from a group consisting of: Plaster of Paris, sand, graphite fibers or other carbon, fly ash, fly-ash components, glass spheres or beads, hollow-spheres, cenospheres, talcum, calcium carbonate, fused silica, garnet, sodium chloride, calcium chloride, potassium chloride, nitrates, nitrites, sugars, alumina, aluminum tri-hydrate, and combinations thereof.

8. The composition of claim 1, wherein the organic binder material comprises a protein.

9. The composition of claim 1, wherein the aggregate material comprises sodium chloride.

10. The composition of claim 1, wherein the melt processing aid is present in an amount sufficient to enable moldability of the organic binder.

11. A composition for use in manufacturing a water-soluble tooling material using a resin transfer molding apparatus, the composition comprising, by volume: about 5-20% PetOx, about 5-20% PVP, and about 60-90% aggregate.

12. The composition of claim 11, wherein the composition comprises, by volume: about 15% PVP, about 15% PetOx, and about 70% NaCl.

13. The composition of claim 11, wherein the composition comprises, by volume, about 13% PVP, about 7% PetOx, and about 80% NaCl.

14. A mixture for use in manufacturing a water-soluble tooling material using a resin transfer molding apparatus, the mixture comprising, by volume: from about 1% to about 20% of a water-soluble melt-processing aid, from about 3% to about 30% organic binder, and from about 50% to about 90% aggregate material.

15. A method for resin transfer molding, comprising:
providing a preform or mat having a shape of a finished product;
placing the preform or mat into a mold cavity having the shape of the finished product;
closing the mold cavity;
injecting the composition of claim 1 into the closed mold cavity under pressure; and
cooling the injected particulate mixture.

16. The method of claim 15, wherein the finished product is a mandrel.

17. The method of claim 15, wherein the preform or mat includes a fibrous material.

18. The method of claim 15, wherein the organic binder material comprises polyvinylpyrrolidone and the melt processing aid comprises at least one of PetOx and PEG.

19. The method of claim 15, wherein the composition comprises, by volume, about 5-20% PetOx, about 5-20% PVP, and about 60-90% aggregate.

* * * * *